Dec. 25, 1956 W. C. SPEED ET AL 2,775,450
ALIGNING MEANS TO BE USED IN THE PRODUCTION
OF MAGNETIC SOUND RECORDING TAPE
Filed June 20, 1952 4 Sheets-Sheet 1

INVENTORS
WILLIAM C. SPEED
JAMES J. DWYER
BY
Pennie, Edmonds, Morton, Barrows and Taylor
ATTORNEYS INVENTORS
WILLIAM C. SPEED
JAMES J. DWYER
BY
Pennie, Edmonds, Morton, Barrows and Taylor
ATTORNEYS Dec. 25, 1956 W. C. SPEED ET AL 2,775,450

ALIGNING MEANS TO BE USED IN THE PRODUCTION OF MAGNETIC SOUND RECORDING TAPE

Filed June 20, 1952 4 Sheets-Sheet 3

INVENTORS
WILLIAM C. SPEED
JAMES J. DWYER
BY
Pennie, Edmonds, Morton, Barrows and Taylor
ATTORNEYS INVENTORS
WILLIAM C. SPEED
JAMES J. DWYER
BY
Pennie, Edmonds, Morton, Barrows and Taylor
ATTORNEYS United States Patent Office 2,775,450

Patented Dec. 25, 1956

2,775,450

ALIGNING MEANS TO BE USED IN THE PRODUCTION OF MAGNETIC SOUND RECORDING TAPE

William C. Speed, Riverside, and James J. Dwyer, Stamford, Conn., assignors to Audio Devices, Inc., New York, N. Y., a corporation Application June 20, 1952, Serial No. 294,634

9 Claims. (Cl. 271—2.6)

This invention relates to the production of magnetic sound recording tape and has for its object improvements useful more particularly in the drying of tape base just coated with a dispersion of finely divided magnetic material.

It is customary in this art to pass a relatively long, narrow and very thin tape base band, usually of paper or plastic, successively through an unwinding, a magnetic coating, a drying and a winding zone. The tape base is unwound from a roll in the first zone; one side is coated in whole or in part or parts in the second zone, usually with a dispersion of finely divided magnetic oxide of iron, synthetically produced, in a liquid binder and solvent; the coating is dried in the third zone; and the dried tape base is wound into a roll in the fourth zone. In some cases the tape base from the unwinding zone is passed first through an adhesive recoating zone and a precoat drying zone for partial drying of the adhesive before reaching the magnetic coating zone. This is to prepare the tape base for better adherence of the magnetic material. While passing through the main drying zone, the coating of magnetic material is dried or substantially dried, the solvent being volatilized to leave a pliable residue of magnetic material. Such a practice is disclosed, for example, in our copending applications, Serial Nos. 201,974 and 201,991, filed December 21, 1950, and Serial No. 264,181, filed December 29, 1951.

In the case of ordinary, imperforate, magnetic sound recording tape, not the moving picture film type containing sprocket holes, it is customary to employ tape base sufficiently wide, after coating and drying, to be slit or cut lengthwise into a plurality of pieces of tape which are wound separately into rolls. Such a practice is disclosed, for example, in our copending application, Serial No. 201,985, filed December 21, 1950.

Certain difficulties arise in each zonal operation. The present application is concerned chiefly with certain difficulties that arise in the drying zone, although similar difficulties are prevalent to a certain extent in the other zones as well.

In the course of a day, many thousands of feet of tape base may be processed. Roll after roll of tape base is unwound, coated, dried and wound into a roll. For best economic results the tape base is caused to travel rapidly in a fixed path of travel. Since the tape base is very thin, often contains wrinkles, is warped, or can readily warp, there is a strong tendency for the tape base to move away from such a fixed course. Various manually operated aligning or centering devices have been proposed to solve the problem of confining the tape base to its precise course. While they can be effective, the attention and skill of operators are required for the purpose. Such devices are disclosed, for example, in our copending applications. An automatically operated device for the purpose is disclosed also in the first of our copending applications, as well as in our co-pending application Serial No. 201,982, filed December 21, 1950, now Patent No. 2,702,522 of which this application is a continuation-in-part. It may be referred to briefly as a suction-operated pivoting-guide arrangement for the advancing tape base. In the specific device illustrated, the guide pivots at one end, laterally to the side of and removed from the normal path of travel of the tape base. While far superior to the manually operated devices, this automatic aligning device is somewhat deficient in sensitivity during operation. Its response to a call for action leaves something to be desired, particularly when the tape base is traveling at a relatively high speed.

Our investigations have led to the discovery of improvements in such an automatic tape base aligning device which renders it highly sensitive to the slightest deviations of the tape base from its predetermined path of travel and causes it to respond so quickly to a call for action, either to the right or the left, that it is practically impossible for the tape base to wander even slightly from its prescribed course.

The features of the invention will be better understood by referring to the accompanying drawings, taken in conjunction with the following description, in which.

Since the present improvements relate primarily to the automatic tape base aligning device and the manner in which it functions to keep the tape base accurately confined in its predetermined course, the remainder of the apparatus will not be described in detail; more particularly because such a description is contained in Serial No. 201,974.

Figure 1:
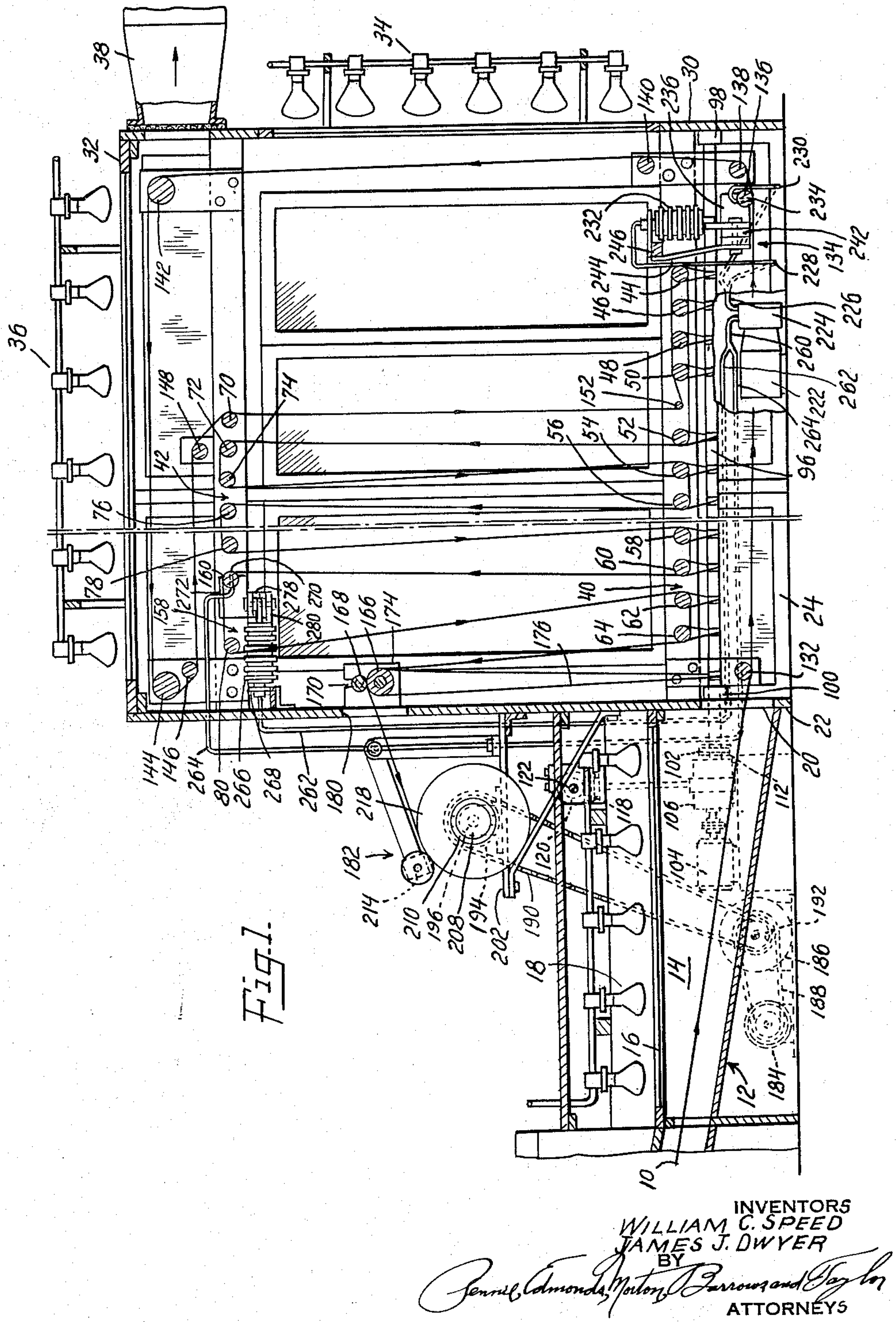
Fig. 1 is a sectional side elevation of an apparatus illustrative of a practice of the invention.

Referring to Fig. 1, it may be helpful to trace the course of coated tape base 10 through the apparatus shown. The tape base itself comes from an unwinding and a coating zone, not here shown but shown in Serial No. 201,974. As the tape base leaves the coating zone, its fresh coating of magnetic material is partially dried with heated air, the air and the coated tape base advancing into a preliminary radiant-heat drying zone or drying device 12, which is formed of a downwardly inclined duct 14 surmounted by a glass cover 16 over which extends a bank 18 of electric lights, preferably infra-red bulbs. The partially air-dried magnetic coating thus receives further air and also radiant-heat drying, as it advances through the duct.

The partially dried tape base passes through an inlet 20 near the bottom of the near end wall 22 of an upright generally rectangular main drying chamber 24. The front and back side walls 26 and 28, the far end 30 and the top 32 of the chamber are fitted with glass windows or doors for visibility, easy access and transmission of radiant-heat. Thus, the far end wall and the top are flanked, respectively, with banks 34 and 36 of electric lights, preferably infra-red bulbs, to supply radiant heat to the chamber. An outlet 38 is located in the upper right corner of the chamber for the escape of spent air and volatilized vapors.

Before tracing the course of the tape base in the chamber, it may be noted that a plurality of guides are so spaced laterally in the chamber, between the front and back side walls, as to provide an extended, more or less zig-zag, path of travel for the tape base. They include a lower tier 40 of power-driven rollers and an upper tier 42 of idler rollers; the two tiers of rollers being located between some lower-most rollers and some uppermost rollers to be mentioned below.

Returning for a moment to the lower tier of power-driven rollers, they include, reading from right to left as one views Fig. 1, a first series of four rollers 44, 46, 48 and 50, used to propel the tape base across a magnectic testing zone, of no particular concern here but which is discussed in some detail in Serial No. 201,974; and a second series of seven rollers 52, 54, 56, 58, 60, 62 and 64.

Figure 2:
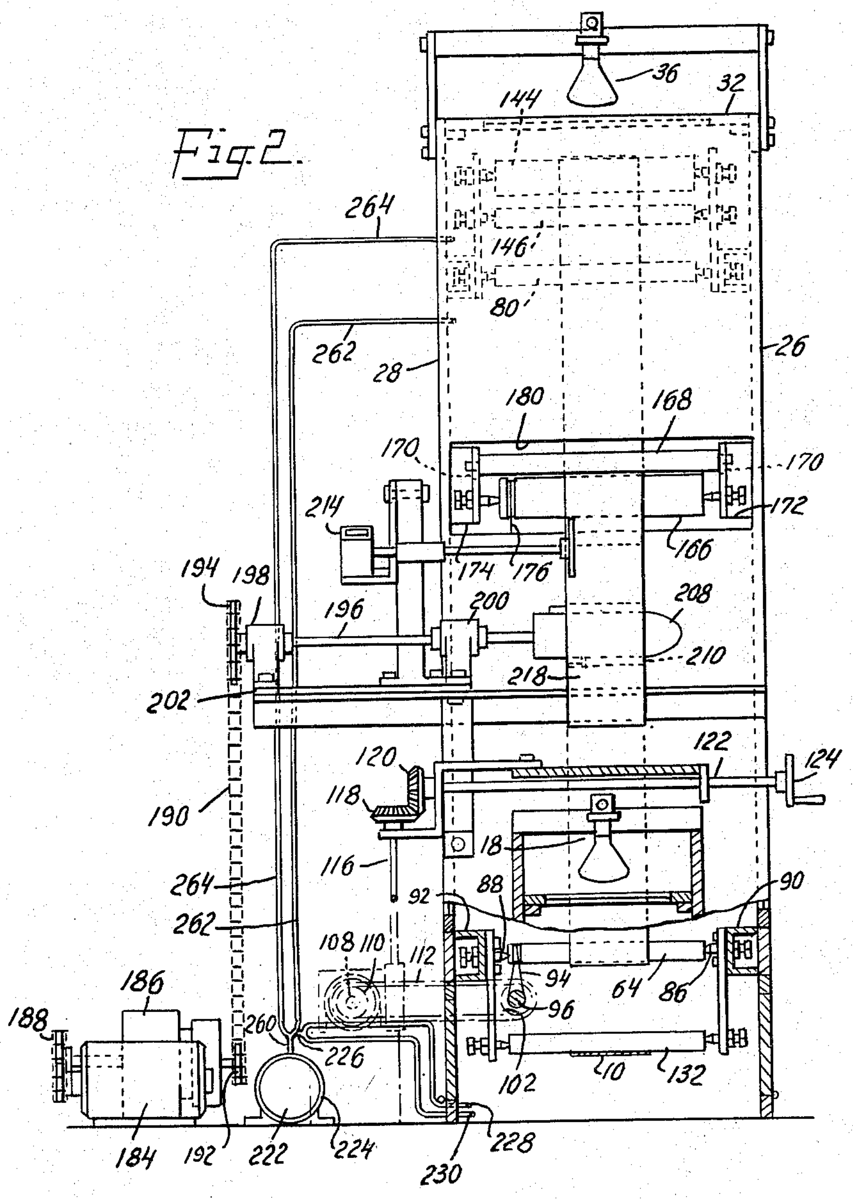
Fig. 2 is an end elevation, with parts broken away, of the same from the left or charging end, as one views Fig. 1.

The construction and mounting of the latter power-driven roller, as shown in Fig. 2, may be regarded as typical of all of them. It is suspended at its ends between adjustable pivot pins 86 and 88 mounted in channels 90 and 92 extending lengthwise of the front and back sides of the interior of the chamber. The far end of the roller is provided with an annular recess to receive a belt 94. The lower portion of the belt fits around a horizontal driven shaft 96 extending lengthwise of the back side wall of the interior of the chamber. The right end of the shaft fits (Fig. 1) in journal 98, while the left end extends through a journal 100 and near end wall 22 to terminate in a sprocket 102.

The driving mechanism includes (Fig. 1) a motor 104, a gear-reducer 106, and a drive shaft 108 terminating in a sprocket 110. A drive chain 112 fits over that sprocket as well as sprocket 102. An upright speed control rod 116 extends from the gear-reducer to a bevel gear 118 in mesh with a complementary bevel gear 120 fitted to the far end of a transverse rod 122. The near end of the latter rod terminates in a hand wheel 124, which may be turned to increase or decrease the speed of rotation of drive shaft 108, and hence of driven shaft 96 and all of the lower tier 40 of power-driven rollers.

On passing through inlet 20 (Fig. 1), the coated side of the tape base meets and slides against the under side of the first undermost roller 132 in the near end of the chamber; horizontally to a first automatic aligning device 134 and around its pivoting guide rod 136 (described below); to roller 138 at the far end of the chamber; then upwardly against roller 140; past bank 34 of infra-red bulbs; around roller 142 in the upper right corner of the chamber; horizontally to the left past bank 36 of infra-red bulbs; to and around roller 144 in the upper left corner of the chamber; around roller 146; horizontally to the right around roller 148; downwardly around roller 70 horizontally around fixed guide 152; around the first series of power-driven rollers 44, 46, 48 and 50 to first roller 52 in the second series; thence upwardly and downwardly in succession and alternately around the first five of the upper tier 42 of idler rollers and the first five of the lower tier 40 of power-driven rollers; to a second automatic aligning device 158 and around its pivoting guide 160 (described below); to and around the last roller 80 in the upper series, and to and around the last two power-driven rollers 62 and 64 in the second of the lower series.

It will be noted that the tape base follows an extended tortuous path of travel in the drying chamber, the coating itself being kept out of contact with any physical object until it sweeps over roller 148. By that time the coating is sufficiently dry not to be damaged by contact at intervals with some of the succeeding rollers or guides.

The dried tape base rises from the last roller 64 in the second series of power-driven rollers, at the near end of the chamber, to and between a pair of superposed rollers 166 and 168. The latter is an idler roller, with ends of reduced diameter fitting by gravity in slots 170 (Fig. 1) in brackets 172 and 174 (Fig. 2). The former roller is a power-driven roller, preferably having a gripping surface, such as rubber, frictionally to help hold the tape base between the rollers and thus to keep the forward end of the tape base from springing back into the chamber. A drive belt 176 fits in an annular recess (Fig. 2) in the far end of the roller and around the left end portion of driven shaft 96 (Fig. 1). The dried tape base passes through an outlet 180 in the near end wall of the chamber to a winding machine 182.

Before tracing the further progress of the tape base, the winding machine (Figs. 1 and 2) will be briefly described. It includes (Fig. 2) a motor 184 connected to a speed controller 186 by a sprocket-chain 188, a sprocket-chain 190 connects a sprocket-wheel 192 on the end of the speed-controller shaft with a sprocket-wheel 194 on the far end of a transverse winding shaft 196 supported in journals 198 and 200 on a platform 202. The near end of the winding shaft is fitted with a core 208 adapted to fit into a hub 210. A linear length or footage counter 214 is associated with the winding mechanism.

The forward end of the dried tape base is secured to hub 210; transverse winding shaft 196 is rotated; and the tape base is wound into a roll 218 as fast as it issues from the drying chamber. Since the tap base issues from the chamber at a substantially constant speed, and the circumferential speed of the roll tends to increase as its diameter increases, speed-controller 186 automatically adjusts the speed of the winding shaft to that required to keep the roll turning just fast enough to take up the issuing tape base.

It is highly important, as already pointed out, that the moving tape base be rather accurately confined to its normal path of travel, especially during the drying operation. It has been found that two automatic tape base aligning devices, strategically located in the chamber, are adequate for the purpose, in the case of the apparatus now being employed in a practice of the invention. Those particular devices and their mode of operation will now be described.

First automatic tape base aligning device 134 (Fig. 1) is placed advantageously in the lower right corner of the drying chamber. As indicated in Fig. 1, the device may then exert an aligning or centering action on the approaching tape base extending far to the left, to the coating machine in fact, and on the receding tape base extending far to the right and left. Second automatic aligning device 158 is located near the upper left corner of the chamber where it exerts an aligning or centering action on the approaching tape base a substantial distance back toward the first aligning device, to a point no doubt about where the influence of the first device is about spent. It is not necessary, of course, to have the influence of the two devices overlap to any substantial extent. The second device also exerts its aligning effect on the receding tape base as far as the winding zone. These aligning controls are augmented, of course, by the manner in which the other guides and rollers are placed. They should be horizontal and parallel to each other. The rollers should turn easily. The tape base itself should be in good condition, substantially uniform in thickness and width, and reasonably free of warped areas.

Both automatic aligning devices are connected operatively (Figs. 1 and 2) with a motor 222 and a suction or exhaust fan 224. In the case of first aligning device 134 (Figs. 1–5), a common conduit 226 extends from the suction fan and terminates in branch conduits 228 and 230. The first branch connects the upper end of a vertically placed bellows 232 and the second branch connects the upper end of a small hole or passageway 234 extending through the near end portion of guide rod 136, in the near side line of the path of travel of the tape base.

The guide rod is integrally supported at its ends to lugs 236 and 238 extending forwardly of the ends of a pivoting bracket 240. A roller or ball-bearing 242 is secured to the rearward mid-portion of the pivoting bracket, and to the lower end of a depending support 244 in turn attached to the roller-bearing. The upper end of the depending support is secured to a cross-support 246 attached to side channels 90 and 92. It will thus be seen that the pivoting bracket and hence its pivoting guide rod are free to oscillate in a vertical plane about a horizontal axis passing through its center in the direction of travel of the tape base.

The far end of the pivoting bracket (Fig. 4) is hingedly secured to the lower end of bellows 232. The upper end of the bellows is secured to a lateral plate 248 in turn fastened to cross-support 246. The lower end of a depending spring 250 is attached to the near end of the pivoting bracket, the upper end of the spring being anchored to a lateral plate 252 secured to cross-support 246.

The location of small suction hole 234 controls and fixes the position of the tape base on pivoting guide rod 136. Bellows 232 and spring 250 normally keep the guide rod substantially at right angles to the direction of travel of the tape base toward and away from the guide rod.

Figures 3, 3A, 4, 5, 6, 7, 7A, 8:
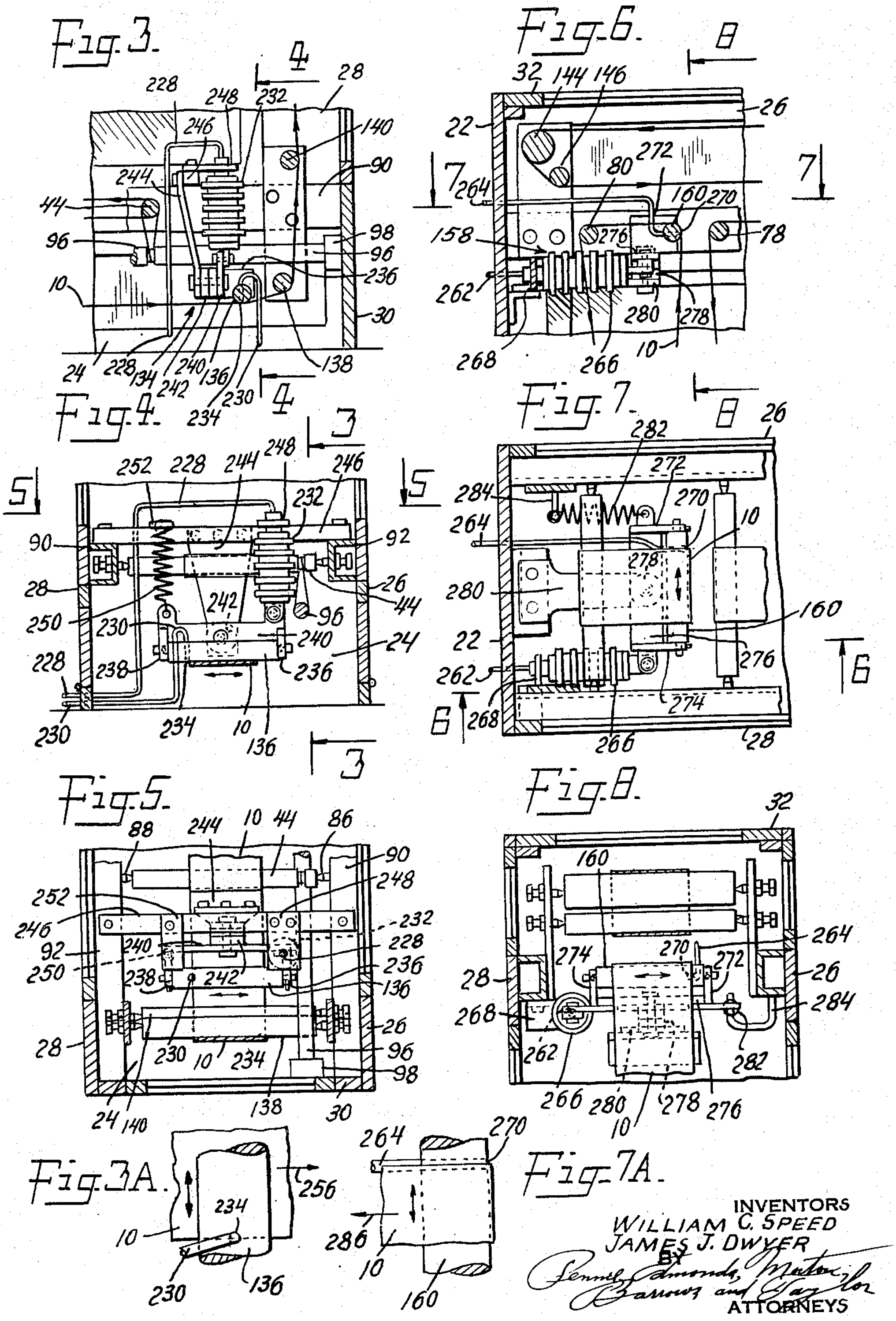
Fig. 3 is an enlarged fragmentary view of the lower right end corner section of the main drying chamber of the apparatus, as one views Fig. 1, showing an automatic tape base aligning device.
Fig. 3A is an enlarged detail from Fig. 3, showing the tape base in juxtaposition to a pivoting guide and its suction conduit.
Fig. 4 is a section on the line 4—4 of Fig. 3.
Fig. 5 is a section on the line 5—5 of Fig. 4.
Fig. 6 is an enlarged fragmentary view of the upper left-hand corner portion of the main drying chamber of the apparatus, showing a second automatic tape base aligning device.
Fig. 7 is a section on the line 7—7 of Fig. 8.
Fig. 7A is an enlarged detail from Fig. 7, showing the tape base juxtaposed to a pivoting guide and its suction conduit.
Fig. 8 is a section on the line 8—8 of Fig. 6.

As one stands over and looks at Fig. 3A in the forward direction of travel of the tape base, indicated by arrow 256, the following manual steps may be assumed, by way of preliminary illustration: If the guide rod is pivoted slightly in a counter-clockwise direction, in the plane of Fig. 4, it exerts a greater pressure on the left or far marginal side than on the right or near marginal side of the tape base. This causes the tape base to creep laterally toward the right or near side; namely, toward and over small hole 234. If the guide rod is pivoted slightly in a clockwise direction, reverse conditions are set up. Pressure of the guide rod is lessened on the left or far marginal side, and increased on the right or near marginal side of the tape base. The tape base then creeps to the left away from the hole. The guide rod may be pivoted or oscillated back and forth in a small arc in such a manner that the small hole is barely closed and opened by the advancing tape base; so that the hole may be utilized as a stop to limit lateral movement of the tape base, thus centering or aligning the tape base in its path of travel.

According to the present practice, the advancing tape base is aligned or centered automatically. To this end, the normal tension of the bellows and of the spring, when the bellows are not under suction, may be adjusted with respect to each other so that the guide rod is at a right angle to the direction of travel of the tape base. The guide rod may be slightly biased, however, in a clockwise or a counter-clockwise direction; that is, the small hole in the near end of the guide rod may be slightly to the right or to the left of a line passing through the pivot point of the guide rod perpendicularly to the direction of travel of the tape base, as one views Fig. 3.

When the guide rod is biased clockwise, the pressure of the tape base toward the near end of the guide rod is increased, while the pressure on the far end is decreased, so that the tape base tends to creep toward the far end, away from the small hole in the near end of the guide rod. When the guide rod is biased in a counter-clockwise direction, the pressure of the tape base toward the far end of the guide rod is increased, while the pressure on the near end is decreased, so that the tape base tends to creep toward the near end, toward and across the hole.

If the guide rod is to be biased, it is preferred to have it slightly in a counter-clockwise direction, so that the tape base will creep toward and over the hole without help from an operator. If the guide rod is biased clockwise, the tape base will creep away from the hole and the operator must position manually the near side of the tape base over the hole to initiate the automatic control. Whatever preliminary tape base-guide rod positioning tactic is followed, the near marginal side of the tape base should extend across the hole.

Suction is employed to keep the near marginal side of the tape base at the hole. When the tape base extends over and covers the hole, branch conduit 228 and 230 and bellows 232 are placed under suction. This causes the bellows to contract, thus drawing the far end of the guide rod clockwise. As that occurs, pressure of the guide rod on the near side of the tape base is increased, and pressure of the guide rod on the far side of the tape base is decreased. This causes the tape base automatically to creep toward the far end of guide rod, away from the hole in the near end of the guide rod. As soon as the small hole is uncovered, normally only in part, outside air is drawn into and through the hole into the branch conduits and bellows, thus breaking the suction in the conduits and bellows.

Spring 250 then pulls the bellows into their normal expanded position. Since the spring biases the guide rod, at least in a presently preferred practice, in a slight counter-clockwise direction, pressure of the far end of the guide rod on the tape base is increased, while the pressure on the near end is decreased. This causes the tape base to creep back over the hole, thus causing the conduits and bellows again to be placed under suction. As that occurs, the bellows are re-contracted; which causes the tape base to move laterally toward the far end of the guide rod, away from the hole.

The cycle described is repeated continuously and rapidly. The amount of lateral movement of the tape base on the guide rod is so slight and the rate of oscillation so fast as hardly to be preceptible to the eye. Once set in operation, the device does its tape base aligning or centering work automatically and efficiently.

While the guide rod is said to pivot, in the instant construction the rod moves when the pivoting bracket moves about its pivoting or fulcrum point. Since that point is a short distance from the rod, the rod actually moves in a small limited arc. The closer the point is to the rod, the more closely does the rod simulate a true pivoting movement. The pivoting or fulcrum point actually may be on or in the rod itself, opposite the area of contact with the tape base. However, a precise pivoting movement of the rod is not necessary. A construction such as shown is simple and ample, more especially because it permits the use of a highly efficient roller or ball-bearing for the pivoting or fulcrum point.

The construction and operation of second automatic aligning device 158 are quite similar to that of first aligning device 134. It is shown in Figs. 1, 2, 6, 7, 7A and 8. A common conduit 260 (Fig. 1) extends from suction fan 224 and terminates in branch conduits 262 and 264. The former branch connects, as one views Figs. 1, 6 and 7, with the left end of a horizontally disposed bellows 266, anchored at its left end to a fixed bracket 268. The latter branch connects a small suction hole or passageway 270 extending horizontally through the far end portion of pivoting guide rod 160 directly at the far marginal side line or edge of the normal path of travel of the tape base.

The latter pivoting guide rod is integrally supported at its ends to lugs 272 and 274, extending forwardly of the ends of a pivoting bracket 276. A roller or ball-bearing 278 is secured to the mid-portion of the pivoting bracket at a level below that of the guide rod and to the right end of a horizontally extending support 280 secured to the near end wall of the drying chamber. It will thus be seen that the pivoting bracket and hence the guide rod are free to pivot or oscillate in a horizontal plane about a vertical axis substantially perpendicular to the path of travel of the tape base as it passes away from the guide rod.

The near end of the pivoting bracket is hingedly secured to the free right end of the bellows. The far end of the pivoting bracket is secured to one end of a horizontally disposed spring 282, while the other end of the spring is anchored to a fixed bracket 284.

In a manner similar to the first aligning device, the location of the small hole 270 controls and fixes the position of the tape base on the guide rod of the second aligning device. Bellows 266 and spring 282 normally keep the guide rod substantially at right angles to the general direction of travel of the tape base toward and away from the guide rod.

As one stands and looks at Fig. 7A in the forward direction of travel of the tape base from the guide rod (which is opposite to that of Fig. 3A discussed above), indicated by arrow 286, the following manual steps may be assumed, by way of further preliminary illustration: If the guide rod is pivoted slightly in a counter-clockwise direction, in the plane of Fig. 7, it exerts a greater pressure on the left or near marginal side than on the right or far marginal side of the tape base. This causes the tape base to creep laterally toward the right or far side; namely, toward and over small hole 270. If the guide rod is pivoted slightly in a clockwise direction, reverse conditions are set up. Pressure of the guide rod is lessened on the left or near marginal side, and increased on the right or far marginal side of the tape base. The tape base then creeps to the left, away from the hole. The guide rod may be pivoted back and forth in a small arc in such a manner that the small hole is barely closed and opened by the advancing tape base; so that the hole may be utilized as a stop to limit lateral movement of the tape base, thus centering or aligning the tape base in its path of travel.

According to the present practice, the advancing tape base is aligned or centered automatically. To this end, the normal tension of the bellows and of the spring, when the bellows are not under suction, may be adjusted with respect to each other so that the guide rod is at right angles to the direction of travel of the tape base. The guide rod may be slightly biased, however, in a clockwise or a counter-clockwise direction; that is, the small hole in the far end of the guide rod may be slightly to the right or to the left of a line passing through the pivot point of the guide rod perpendicularly to the direction of travel of the tape base, as one views Fig. 7.

When the guide rod is biased clockwise, the pressure of the tape base toward the far end of the guide rod is increased, while the pressure on the near end is decreased, so that the tape base tends to creep toward the near end, away from the small hole in the far end of the guide rod. When the guide rod is biased in a counter-clockwise direction, the pressure of the tape base toward the near end of the guide rod is increased, while the pressure on the far end is decreased, so that the tape base tends to creep toward the far end, toward and across the hole.

If the guide rod is to be biased, it is preferred to have it slightly in a counter-clockwise direction, so that the tape base will creep toward and over the hole without help from an operator. If the guide rod is biased clockwise, the tape base will creep away from the hole and the operator must position manually the near side of the tape base over the hole to initiate the automatic control. Whatever preliminary tape base-guide rod positioning tactic is followed, the far side of the tape base should extend across the hole.

Suction is employed to keep the far side of the tape base at the hole. When the tape base extends over and covers the hole, branch conduits 262 and 264 and bellows 266 are placed under suction. This causes the bellows to contract, thus drawing the near end of the guide rod clockwise. As that occurs, pressure of the guide rod on the far side of the tape base is increased, and pressure of the guide rod on the near side of the tape base is decreased. This causes the tape base to creep automatically toward the near end of guide rod, away from the hole in the far end of the guide rod. As soon as the hole is uncovered, normally only in part, outside air is drawn into and through the hole into the suction conduits and bellows, thus breaking the suction in the conduits and bellows.

Spring 282 then pulls the bellows into their normal expanded position. Since the spring biases the guide rod, at least in a presently preferred practice, in a slight counter-clockwise direction, pressure of the near end of the guide rod on the tape base is increased, while the pressure on the far end is decreased. This causes the tape base to creep back over the hole, thus causing the conduits and bellows again to be placed under suction. As that occurs, the bellows are re-contracted; which causes the tape base to move laterally toward the near end of the guide rod, away from the hole.

The cycle described is repeated continuously and rapidly. The amount of lateral movement of the tape base on the guide rod is so slight and the rate of oscillation so fast as hardly to be perceptible to the eye. Once set in operation, the device does its tape base aligning or centering work automatically and efficiently.

In the case of the two automatic aligning devices just described, it will be noted that they happen to be so placed with respect to the path of travel that the tape base exerts a pressure generally toward the bellows and the springs. To obtain the mode of operation desired, the small suction hole is located in the end of the guide rod adjacent the springs. With such an arrangement, the bellows are in a position when contracted by suction to pivot the guide rod into a position that reverses the lateral movement of the tape base, thus causing the covered hole to become uncovered and breaking the suction or vacuum in the conduits and bellows. Oscillation of the tape base at the hole becomes automatic and it is forced to stay in its path of travel.

In the two automatic tape base aligning devices just described, the resilient members, that is, the bellows and the spring, are on the same side of the guide rod; and the tape base exerts its pressure generally toward the bellows and the spring. Under such conditions, the small suction hole is located at the marginal edge of the path of travel adjacent the spring to obtain the desired automatic tape base aligning operation. This is true whether the bellows or the spring is to the right or to the left of the direction of travel, as in the case of automatic devices 134 and 158.

Figures 9, 10, 11:
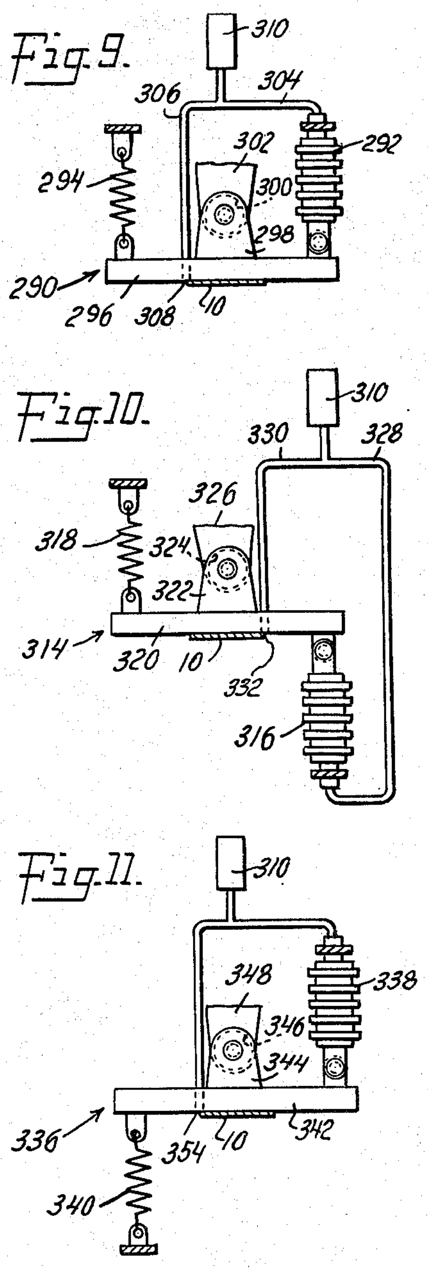
Figs. 9–14 are diagrammatic illustrations of a series of six modifications of such automatic tape base aligning devices.

A similar device 290 is further shown in Fig. 9, which is a simple graphic illustration of a practice of the invention when anchored bellows 292 and an anchored spring 294 are mounted on the same side of the end portion of a guide rod 296 secured at its mid-portion to a pivoting bracket 298, provided with a roller bearing 300 attached to a fixed support 302; and when the thrust or pressure of tape base 10, as one views the figure, may be considered as generally upward or toward the bellows and the spring. A branch suction conduit 304 connects with the bellows while a second branch suction conduit 306 connects with a small hole 308 at the marginal edge of the path of travel of the tape base 10 adjacent the spring. The branch conduits connect each other as well as a source of suction 310, as before. It will be clear that the small hole should be placed adjacent the spring to operate automatically, as above described.

It is sometimes more convenient not to have both resilient members on the same side of the guide rod, when the thrust of the tape base on the guide rod is still generally in the same direction, say upwardly, as further shown in Figs. 10 and 11.

In the case of device 314 shown in Fig. 10, a bellows 316 and a spring 318 are mounted, respectively, below and above the end portions of a guide rod 320 secured at its mid-portion to a pivoting bracket 322 provided with a roller bearing 324 attached to a fixed support 326; and when the thrust or pressure of tape base 10 may still be considered as generally upward toward the spring. A branch suction conduit 328 connects with the bellows, while a second branch suction conduit 330 connects with a small hole 332 at the marginal edge of the path of travel of tape base 10 adjacent the bellows. It will be noted that in this respect the small hole is differently located, compared with the small suction holes in the guide rods of the three atuomatic devices just described. When the tape base creeps over small hole 332, in the modification of Fig. 10, the bellows contract which pivots the guide rod clockwise to cause the tape base to move laterally back into its path of travel.

In the case of device 336 of Fig. 11, conditions are somewhat reversed from those shown in Fig. 10, except that the thrust or pressure of tape base 10 is still upward. A bellows 338 and a spring 340 are mounted, respectively, on the upper and lower end portions of a guide rod 342 secured at its mid-portion to a pivoting bracket 344 provided with a roller bearing 346 attached to a fixed support 348. A branch suction conduit 350 connects with the bellows while a second branch suction conduit 352 connects with a small hole 354 at the marginal edge of the path of travel of tape base 10 adjacent the spring. In other words, the small hole is now located in the same relative position as the first three modifications described.

It will be clear from what has already been said, that, in the case of such modifications as those shown in Figs. 10 and 11, in each instance the relative positions of the bellows and the spring on the same side of the guide rod may be reversed, and that when that is done the small suction hole in each guide rod remains in its same relative position, namely, in the case of Fig. 10, adjacent the bellows, and in Fig. 11 adjacent the spring. This about covers, at least generally, modifications particularly useful when the thrust or pressure of the tape base is in the direction illustrated.

Figures 12, 13, 14:
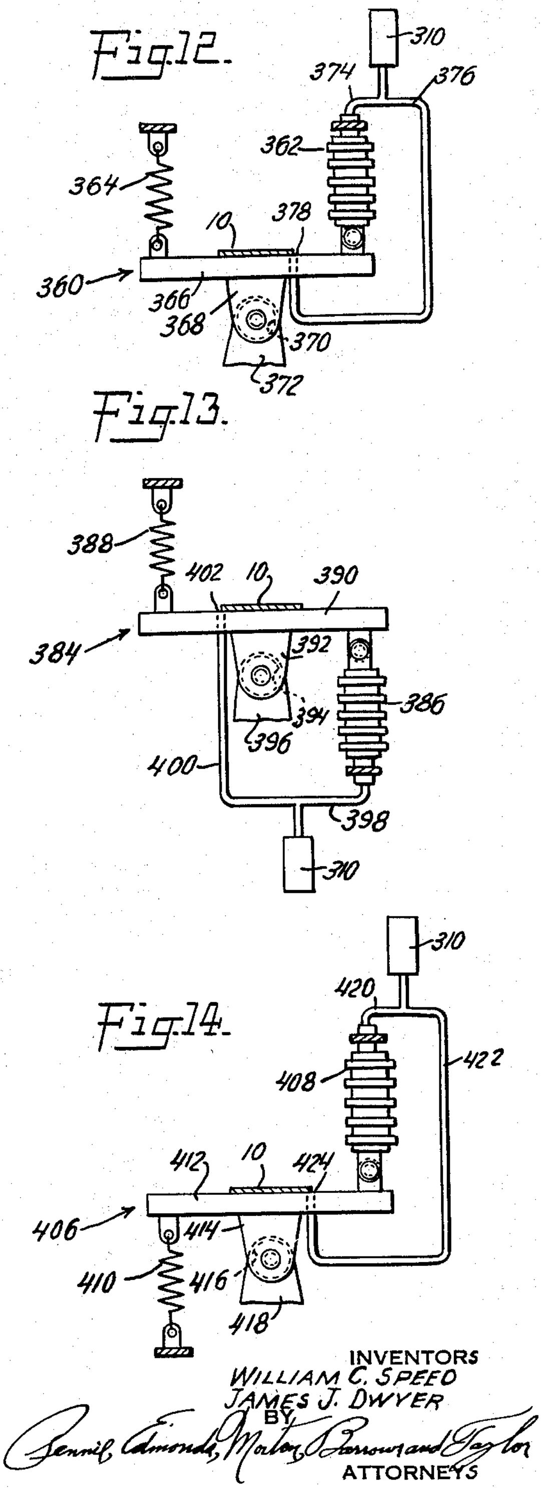

Figs. 12, 13 and 14 are graphic illustrations of useful modifications when the thrust or pressure of the tape base is generally in an opposite direction. The general principles of construction and operation are substantially the same, of course, as those already described.

Thus, in device 360 of Fig. 12, the thrust or pressure of the tape base may be considered, as one views the figure, as in a direction generally away from the resilient members. More specifically, this modification shows a bellows 362 and a spring 364 mounted on the same side of the end portions of a guide rod 366 secured at its mid-portion to a pivoting bracket 368 provided with a roller bearing 370 attached to a fixed support 372. A branch suction conduit 374 connects with the bellows, while a second branch suction conduit 376 connects with a small hole 378 at the marginal edge of the path of travel of tape base 10 adjacent the bellows. In this respect, the small hole is differently located from in the first, second, third and fifth modifications, but is similar to the fourth modification. It will be obvious from a consideration of Fig. 12 that the small hole should be located adjacent the bellows, so that when the tape base moves over the hole and the branch conduits are placed under suction the bellows will contract to pivot the guide rod counter-clockwise, as one views the figure, to cause the tape base to creep laterally toward the spring, away from the small hole.

As before, situations need to be considered, when the thrust or pressure of the tape base is in the same general direction, but it is not advisable, for one reason or another, to place the resilient members on opposite sides of the guide rod.

Thus, in device 384 of Fig. 13, a bellows 386 and a spring 388 are mounted, respectively below and above the end positions of a guide rod 390 secured at its mid-portion to a pivoting bracket 392 provided with a roller bearing 394 attached to a fixed support 396. A branch suction conduit 398 connects with the bellows while a second branch suction conduit 400 connects with a small hole 402 at the marginal edge of the path of travel of tape base 10 adjacent the spring. As compared with the preceding arrangement, it will thus be seen that the small hole is shifted to the opposite side of the path of travel. This is due, of course, to the placement of the bellows and the direction in which it contracts. When the tape base creeps over the small hole, adjacent the spring, the bellows are contracted. This pivots the guide rod clockwise, causing the tape base to creep to the right, away from the hole.

In the case of device 406 shown in Fig. 14, a bellows 408 and a spring 410 are mounted, respectively, above and below the end portions of a guide rod 412 secured at its mid-portion to a pivoting bracket 414 provided with a roller bearing 416 attached to a fixed support 418. A branch suction conduit 420 connects with the bellows while a second branch suction conduit 422 connects with a small hole 424 at the marginal edge of the path of travel of tape base 10 adjacent the bellows. Compared with the preceding modification, conditions are substantially reversed, at least in respect of the placement of the bellows and the spring. When, therefore, the tape base creeps over the small hole adjacent the bellows, the bellows are contracted to pivot the guide rod counterclockwise, thus causing the tape base to creep away from the hole toward the spring.

It will be clear to those skilled in this art that the forms of apparatus or devices and their modes of operation above described are by way of illustration and that the practice of the invention lends itself readily to the use of other modifications.

We claim:

1. In apparatus for producing magnetic sound-recording tape and the like, the improvement which comprises a guide rod for the tape disposed across its path of travel during a processing operation, means pivotally supporting the rod adjacent its mid-portion and intermediate the side edges of said path, a spring having one end attached to a fixed support and its other end attached to one end of the rod and exerting a force on said rod tending to move it toward the fixed support of the spring, a bellows having one end attached to a fixed support and its other end attached to the other end of the rod, a suction conduit for connecting the bellows to a source of suction, a small passageway in the rod having one end thereof terminating adjacent the marginal edge of the path of travel of the tape over the rod, a suction conduit connected to the other end of said passageway and to the suction conduit connected to the bellows, the suction conduit connected to said other end of the passageway and the passageway normally providing a path from the suction pipe to the bellows to the atmosphere so that suction applied to the suction pipe to the bellows will be ineffective to cause contraction of the bellows, whereby when the tape creeps laterally over the end of the passageway terminating adjacent the marginal edge of the path of travel of the tape over the rod, communication between the suction pipe to the bellows and the atmosphere is cut off and suction in that suction pipe is effective to cause a contraction of the bellows with resultant swinging of the rod about its pivotal support, the end of the passageway which terminates adjacent the marginal edge of the path of travel of the tape over the rod being at that side of said path which, when covered by lateral creeping of the tape from its path of travel, will cause the bellows to move the rod about its pivotal support in a direction to cause the tape to move back to its path of travel and to again expose the passageway to atmosphere.

2. Apparatus according to claim 1, in which the small suction hole is located in the end portion of the guide rod adjacent the bellows.

3. Apparatus according to claim 1, in which the small suction hole is located in the end portion of the guide rod adjacent the spring.

4. Apparatus according to claim 1, in which the bellows and the spring are located on the same side of the guide rod.

5. Apparatus according to claim 1, in which the bellows and the spring are located on opposite sides of the guide rod.

6. Apparatus according to claim 1, in which the bellows and the spring are located on the same side of the guide rod, and the small suction hole is located in the end portion of the guide rod adjacent the bellows.

7. Appartaus according to claim 1, in which the bellows and the spring are located on the same side of the guide rod, and the small suction hole is located in the end portion of the guide rod adjacent the spring.

8. Apparatus according to claim 1, in which the bellows and the spring are located on opposite sides of the guide rod, and the small suction hole is located in the end portion of the guide rod adjacent the bellows.

9. Apparatus according to claim 1, in which the bellows and the spring are located on opposite ends of the guide rod, and the small suction hole is located in the end portion of the guide rod adjacent the spring.

References Cited in the file of this patent

UNITED STATES PATENTS

| | | |
|---|---|---|
| 432,993 | Ensign | July 29, 1890 |
| 1,025,184 | Crippen | May 7, 1912 |
| 1,360,717 | Bossert | Nov. 30, 1920 |
| 1,634,984 | Dickhaut | July 5, 1927 |
| 2,244,864 | Witham | June 10, 1941 |
| 2,281,965 | Wylie | May 5, 1942 |
| 2,291,830 | Obenshain | Aug. 4, 1942 |
| 2,331,030 | King | Oct. 5, 1943 |
| 2,491,636 | Amos | Dec. 20, 1949 |
| 2,630,319 | Heilman et al. | Mar. 3, 1953 |